(12) United States Patent
Tardiff et al.

(10) Patent No.: US 11,806,959 B2
(45) Date of Patent: Nov. 7, 2023

(54) TOOLS FOR MANUFACTURING NON-PNEUMATIC TIRES

(71) Applicant: Ford Global Technologies, LLC, Dearborn, MI (US)

(72) Inventors: Janice Lisa Tardiff, Plymouth, MI (US); Adam Wirth, Belleville, MI (US); Wesley Grant Morris, Dearborn, MI (US); Cindy Sofia Barrera-Martinez, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 682 days.

(21) Appl. No.: 16/838,174

(22) Filed: Apr. 2, 2020

(65) Prior Publication Data

US 2020/0324497 A1    Oct. 15, 2020

Related U.S. Application Data

(60) Provisional application No. 62/832,921, filed on Apr. 12, 2019.

(51) Int. Cl.
| | |
|---|---|
| *B29D 30/02* | (2006.01) |
| *B33Y 80/00* | (2015.01) |
| *B29C 45/73* | (2006.01) |
| *B29C 45/26* | (2006.01) |
| *B60C 7/00* | (2006.01) |
| *B29C 33/38* | (2006.01) |
| *B60C 7/10* | (2006.01) |

(52) U.S. Cl.
CPC .......... *B29D 30/02* (2013.01); *B29C 33/3842* (2013.01); *B29C 45/26* (2013.01); *B29C 45/7312* (2013.01); *B33Y 80/00* (2014.12); *B60C 7/00* (2013.01); *B60C 7/107* (2021.08); *B60C 2007/005* (2013.01)

(58) Field of Classification Search
CPC ................................ B29D 30/02; B60C 7/146
See application file for complete search history.

(56) References Cited

U.S. PATENT DOCUMENTS

| | | | | |
|---|---|---|---|---|
| 1,027,409 | A | * | 5/1912 | Etzold ........................ B60B 9/26 |
| | | | | 152/85 |
| 1,177,628 | A | * | 4/1916 | Immke ....................... B60B 9/10 |
| | | | | 152/80 |

(Continued)

FOREIGN PATENT DOCUMENTS

| | | | |
|---|---|---|---|
| EP | 1980301 | A1 * | 10/2008 |
| WO | WO-0078560 | A1 * | 12/2000 |

(Continued)

*Primary Examiner* — Benjamin A Schiffman
(74) *Attorney, Agent, or Firm* — Burris Law, PLLC

(57) ABSTRACT

A molding tool for forming a non-pneumatic tire includes a wheel portion cavity, a tread ring portion cavity, and a plurality of spoke cavities extending between the wheel portion cavity and the tread ring portion cavity. At least a subset spoke cavities within the plurality of spoke cavities include at least one of a non-uniform thickness, a non-uniform width, and a non-uniform surface. Also, the molding tool can include a conformal thermal control channel, e.g., a conformal cooling channel and/or a conformal heating channel, proximate to at least one mold cavity.

17 Claims, 5 Drawing Sheets

(56) References Cited

U.S. PATENT DOCUMENTS

| | | | | |
|---|---|---|---|---|
| 1,215,730 | A * | 2/1917 | Smith | B60B 9/26 152/72 |
| 1,349,019 | A * | 8/1920 | Timberlake | B60B 9/26 152/80 |
| 1,373,101 | A * | 3/1921 | Schlake | B60B 9/26 152/82 |
| 1,643,248 | A * | 9/1927 | Lawrence | B60B 9/26 152/85 |
| 3,957,101 | A * | 5/1976 | Ippen | B60C 7/12 152/5 |
| 4,026,342 | A * | 5/1977 | Wormley | B60B 9/04 152/73 |
| 4,379,104 | A * | 4/1983 | Koorevaar | B29D 30/02 264/DIG. 83 |
| 4,525,132 | A * | 6/1985 | Williams | B29D 30/02 425/117 |
| 4,553,577 | A * | 11/1985 | Gregg | B60B 9/26 152/80 |
| 4,921,029 | A * | 5/1990 | Palinkas | B60C 7/26 152/323 |
| 4,945,962 | A * | 8/1990 | Pajtas | B60C 7/12 152/7 |
| 8,636,490 | B1 * | 1/2014 | Martin | B29D 30/02 425/170 |
| 9,440,404 | B2 * | 9/2016 | Martin | B29D 30/02 |
| 9,895,933 | B2 * | 2/2018 | Sugiya | B60C 7/14 |
| 9,950,458 | B2 * | 4/2018 | Wilson | B29C 33/0077 |
| 10,252,572 | B2 * | 4/2019 | Nomura | B60C 7/143 |
| 10,870,314 | B2 * | 12/2020 | Wilson | B60B 23/00 |
| 11,260,695 | B2 * | 3/2022 | Cron | B60C 7/146 |
| 11,370,249 | B2 * | 6/2022 | Wilson | B60C 7/22 |
| 11,505,003 | B2 * | 11/2022 | Cron | B60C 11/0302 |
| 2004/0012246 | A1 * | 1/2004 | Rhyne | B60B 1/0223 301/55 |
| 2011/0126948 | A1 * | 6/2011 | Boyer | B60B 9/04 152/76 |
| 2014/0062168 | A1 * | 3/2014 | Martin | B60C 7/18 301/62 |
| 2014/0062169 | A1 * | 3/2014 | Martin | B60B 5/02 301/62 |
| 2014/0191564 | A1 * | 7/2014 | Gebeau | B60B 3/10 301/41.1 |
| 2015/0210025 | A1 * | 7/2015 | Martin | B29C 33/3842 425/468 |
| 2015/0343845 | A1 * | 12/2015 | Kinney | B60C 7/10 82/1.11 |
| 2019/0009613 | A1 * | 1/2019 | Cron | B60C 7/18 |
| 2019/0337329 | A1 * | 11/2019 | Cron | B60C 7/146 |
| 2020/0009916 | A1 * | 1/2020 | Thompson | B60C 7/18 |
| 2020/0324497 | A1 * | 10/2020 | Tardiff | B29C 45/26 |
| 2020/0324571 | A1 * | 10/2020 | Tardiff | B60C 7/10 |
| 2020/0324573 | A1 * | 10/2020 | Tardiff | B60C 7/18 |

FOREIGN PATENT DOCUMENTS

| | | | |
|---|---|---|---|
| WO | WO-2006112574 | A1 * | 10/2006 |
| WO | WO-2010012091 | A1 * | 2/2010 |
| WO | WO-2018126157 | A1 * | 7/2018 |

* cited by examiner

TOOLS FOR MANUFACTURING NON-PNEUMATIC TIRES

CROSS-REFERENCE TO RELATED APPLICATIONS

This application claims priority to U.S. provisional application No. 62/832,921 filed on Apr. 12, 2019. The disclosure of the above application is incorporated herein by reference.

FIELD

The present disclosure relates to non-pneumatic tires, and more particularly to tools and methods for the manufacture of non-pneumatic tires.

BACKGROUND

The statements in this section merely provide background information related to the present disclosure and may not constitute prior art.

Non-pneumatic tires, also known as flat-free tires, are tires not supported by gas (e.g., air or nitrogen) pressure. Some non-pneumatic tires use spokes between a wheel or hub portion and a tread portion for support, and when such a non-pneumatic tire rolls on or over an object such as a speed bump or a pothole, among others, some of the spokes of the tire are subjected to compressive loads while other spokes are subjected to tensile loads. Particularly, spokes that are between the wheel portion and the tread portion that hit or impact the object (referred to herein as a "contact patch") undergo compressive strain and spokes positioned on an opposite side of the wheel portion relative to the contact patch stretch undergo tensile strain.

Molding tools for manufacturing non-pneumatic tires are made using conventional metal casting and machining techniques. Accordingly, non-pneumatic tire designs incorporate spokes and treads with simple, unidirectional, uniform geometries. To add complexity and/or features to non-pneumatic tire designs, removable molding inserts or modular assemblies of the non-pneumatic tire have been used. However, such approaches add time and cost to the production of the tire.

The present disclosure addresses the issues of forming molding tools for non-pneumatic tires, among other issues related to manufacturing non-pneumatic tires.

SUMMARY

Further areas of applicability will become apparent from the description provided herein. It should be understood that the description and specific examples are intended for purposes of illustration only and are not intended to limit the scope of the present disclosure.

In one form of the present disclosure, a mold for forming a non-pneumatic tire includes a wheel portion cavity, a tread ring portion cavity, and a plurality of spoke cavities extending between the wheel portion cavity and the tread ring portion cavity. At least a subset of the plurality of spoke cavities have thick section cavities configured to form spokes with at least one of a non-uniform thickness and a non-uniform width. In some variations, each of the spoke cavities of the subset of spoke cavities comprise a non-uniform thickness between the wheel portion cavity and the tread ring portion cavity. In at least one variation the subset of spoke cavities each comprise a non-uniform a width. In some variations the subset of spoke cavities each comprise a thick section cavity proximate the wheel portion cavity. In at least one variation the subset of spoke cavities each comprise a thick section cavity proximate the tread ring portion cavity. In some variations the subset of spoke cavities each comprise an elbow between the wheel portion cavity and the tread ring cavity, and a thick section cavity positioned at the elbow.

In some variations of the present disclosure, the mold includes a conformal thermal control channel extending adjacent at least one mold cavity. In at least one variation the conformal thermal channel is a conformal cooling channel. In another variation the conformal thermal channel is a conformal heating channel. In some variations the conformal thermal channel comprises a conformal cooling channel and a conformal heating channel. In at least one variation the subset of spoke cavities each comprise a thick section cavity and a conformal thermal channel extends adjacent each thick section cavity.

In some variations the plurality of spoke cavities are bounded by spoke cavity walls and at least one of the spoke cavity walls has a surface configured to form a pattern on a spoke surface formed against the at least one of the spoke cavity wall. In at least one variation the surface of the at least one cavity wall is configured to increase a surface roughness on a spoke surface formed against the at least one of the spoke cavity wall. In the alternative, or in addition to, the surface of the at least one cavity wall is configured to provide a texture on a spoke surface formed against the at least one of the spoke cavity wall.

In another form of the present disclosure, an additive manufactured mold for forming a non-pneumatic tire includes a wheel portion cavity, a tread ring portion cavity, and a plurality of spoke cavities extending between the wheel portion cavity and the tread ring portion cavity. At least a subset of spoke cavities within the plurality of spoke cavities comprise at least one of a non-uniform thickness, a non-uniform width, and a non-uniform surface. In some variations the subset of spoke cavities each comprise at least one thick section cavity and the at least one thick section cavity is positioned proximate a least one of the wheel portion cavity, the tread ring portion cavity, the tread ring cavity, and an elbow of each of the subset of spoke cavities. In at least one variation of the present disclosure, the additive manufactured mold a conformal thermal control channel extending adjacent at least one of the wheel portion cavity, the tread ring portion cavity, and the subset of spoke cavities.

In still another form of the present disclosure, an additive manufactured mold for forming a non-pneumatic tire includes a wheel portion cavity, a tread ring portion cavity, and a plurality of spoke cavities extending between the wheel portion cavity and the tread ring portion cavity. At least a subset of spoke cavities within the plurality of spoke cavities comprise at least one of a non-uniform thickness, a non-uniform width, and a non-uniform surface and a conformal thermal control channel extending adjacent at least one of the wheel portion cavity, the tread ring portion cavity, and the subset of spoke cavities. In some variations a non-pneumatic tire formed with the additive manufactured mold is provided.

DRAWINGS

In order that the disclosure may be well understood, there will now be described various forms thereof, given by way of example, reference being made to the accompanying drawings, in which.

Figure 1:
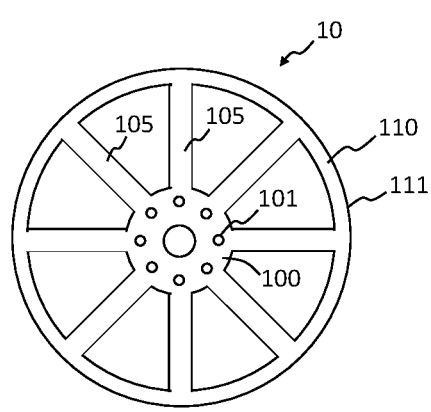
FIG. 1 is a side view of a non-pneumatic tire.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
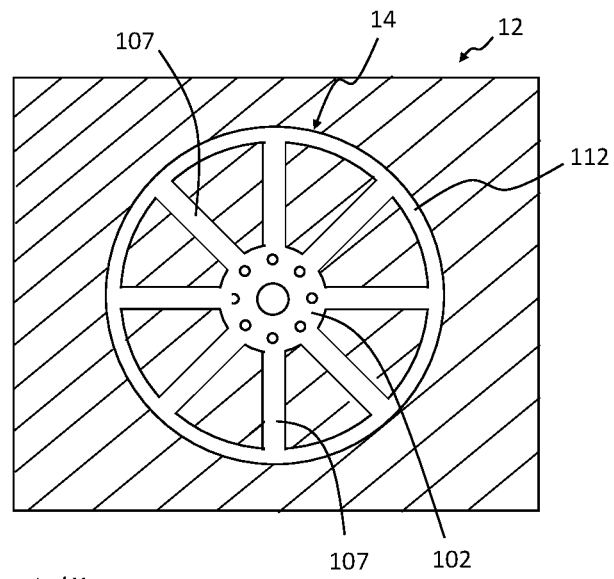
FIG. 2 is a side view of a molding tool for forming the non-pneumatic tire in FIG. 1.

Referring now to FIGS. 1 and 2, a non-pneumatic tire 10 is schematically depicted in FIG. 1 and a molding tool 12 for forming the non-pneumatic tire 10 is schematically depicted in FIG. 2. The non-pneumatic tire 10 includes a wheel portion 100, a tread ring portion 110, and a plurality of spokes 105 extending between and attached to the wheel portion 100 and the tread ring portion 110. In some variations of the present disclosure, the wheel portion 100 includes a plurality of lug nut apertures 101 and the tread ring portion includes a tread 111. The molding tool 12 (FIG. 2) includes a non-pneumatic tire cavity 14 with a wheel portion cavity 102, a tread ring portion cavity 112, and a plurality of spoke cavities 107 extending between the wheel portion cavity 102 and the tread ring portion cavity 112. In some variations of the present disclosure, the plurality of spoke cavities 107 are in fluid communication with the wheel portion cavity 102 and/or the tread ring portion cavity 112. It should be understood that one or more desired materials, e.g., one or more polymeric materials, fill the non-pneumatic tire cavity 14 in order to form the non-pneumatic tire 10.

Figure 3:
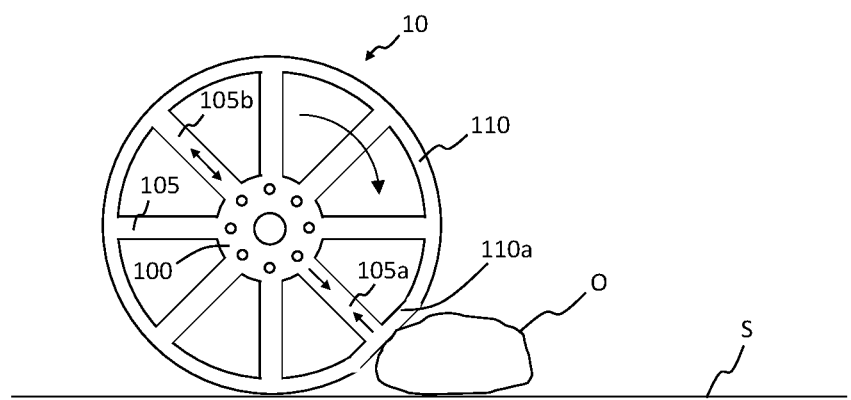
FIG. 3 is the non-pneumatic tire in FIG. 1 impacting an object on a road surface.

Referring now to FIG. 3, the non-pneumatic tire 10 rolling on a road surface 'S' and impacting an object 'O' (e.g., a rock, pothole, etc.) is shown. For example, the non-pneumatic tire 10 can be attached to a vehicle (not shown) traveling along the road surface S. Upon impacting the object O, a contact patch 110a of the tread ring portion 110 is displaced towards the wheel portion 100 thereby resulting in a spoke 105a adjacent to the contact patch 110a being subjected to compression as schematically depicted by the arrows facing each other in FIG. 3. Also, when the non-pneumatic tire 10 hits or impacts the object O, the wheel portion 100 is displaced towards object O and a spoke 105b oppositely positioned the contact patch 110a is subjected to tension as schematically depicted by the double headed arrow in FIG. 3. Accordingly, the spokes 105 experience cyclic compression and tension during use of the non-pneumatic tire 10. It should be understood that cyclic compression and tension of the spokes 105 may result in reduced performance of a spoke 105, reduced performance of the non-pneumatic tire 10 where the spoke 105 is attached or joined to the wheel portion 100, and/or reduced performance of the non-pneumatic tire 10 where the spoke 105 is attached or joined to the tread ring portion 110.

Figure 4:
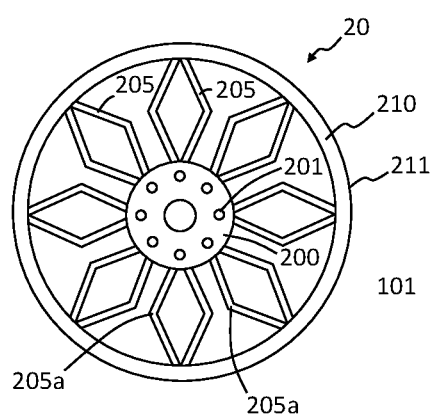
FIG. 4 is a side view of a non-pneumatic tire according to the teachings of the present disclosure.
Figure 5:
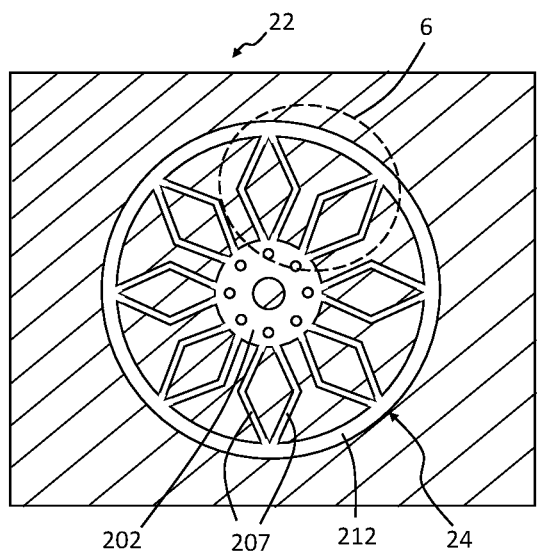
FIG. 5 is a side view of a molding tool for forming the non-pneumatic tire in FIG. 4 according to the teachings of the present disclosure.
Figure 6:
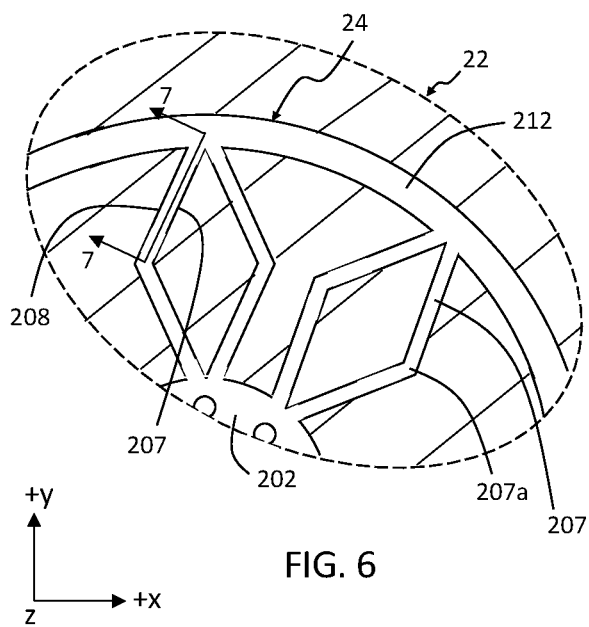
FIG. 6 is an enlarged view of the circled region 6 in FIG. 5 according to one form of the present disclosure.

Referring now to FIGS. 4 and 5, a non-pneumatic tire 20 according one form of the present disclosure is shown in FIG. 4, and a molding tool 22 for forming the non-pneumatic tire 20 according to the teachings of the present disclosure is shown in FIG. 5. The non-pneumatic tire 20 includes a wheel portion 200, a tread ring portion 210, and a plurality of spokes 205 extending between and attached to the wheel portion 200 and the tread ring portion 210. In some variations of the present disclosure, the spokes 205 include and elbow 205a between the wheel portion 200 and the trade ring portion to 10. Also, the wheel portion 200 can include a plurality of lug nut apertures 201 and the tread ring portion can include a tread 211. The molding tool 22 includes a non-pneumatic tire cavity 24 with a wheel portion cavity 202, a tread ring portion cavity 212, and a plurality of spoke cavities 207 extending between the wheel portion cavity 202 and the tread ring portion cavity 212. In some variations of the present disclosure, the plurality of spoke cavities 207 have an elbow 207a as shown in FIG. 6. Also, the plurality of spoke cavities 207 can be in fluid communication with the wheel portion cavity 202 and/or the tread ring portion cavity 212.

In some variations of the present disclosure, the molding tool 22 is formed using additive manufacturing (also referred to herein as "3D printing"). In such variations the design and manufacture of the molding tool 22 is not constrained by line-of-sight machining techniques to produce the mold cavities within the molding tool 22. Also, use of 3D printing to manufacture the molding tool 22 allows features to be included or formed within the molding tool 22 that improve the performance and durability of the non-pneumatic tire 20 as discussed in greater detail below.

Figure 7:
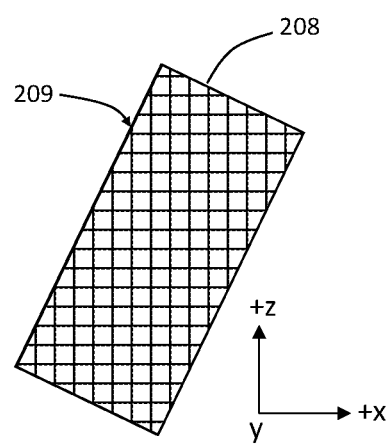
FIG. 7 is a planar view of section 7-7 in FIG. 6 according to the teachings of the present disclosure.

Referring now to FIGS. 6 and 7, in some variations of the present disclosure the molding tool 22 includes a mold cavity wall that provides a pattern on a surface of a spoke 205. Particularly, FIG. 6 is an enlarged view of the circled region 6 in FIG. 5 and FIG. 7 shows a planar view of section 7-7 in FIG. 6. As shown in FIG. 6, the spoke cavities 207 are bound by cavity walls 208, i.e., spokes 205 are formed between the cavity walls 208 during molding (e.g., compression molding, injection molding, among others) of the non-pneumatic tire 20. Also, FIG. 7 illustrates a pattern 209 on the cavity wall 208. It should be understood the pattern 209 is replicated on a surface region of the spoke 205. In some variations of the present disclosure, the pattern 209 on the surface of the spoke 205 increases the durability of the spoke 205. For example, in at least one variation of the present disclosure, the pattern 209 improves flexibility of a selected portion of the spoke 205, i.e., the pattern 209 on the surface of the spoke 205 provides a stiffness modifier to the spoke 205 and/or non-pneumatic tire 20. Non-limiting examples of the pattern 209 include patterns that increase the roughness of a surface of the spoke 205, patterns that provide a texture of a surface of the spoke 205, simple diagonal patterns that are varied from spoke-to-spoke or reverse orientation at a point or line along a single spoke 205, among others. It should be understood that in the alternative, or in addition to, the pattern 209 providing a stiffness modifier to the spoke 205 and/or non-pneumatic tire 20, the pattern 209 can facilitate other functions such as altering water flow across a surface of the spoke 205, snow, ice, and/or mud accumulation on a surface of the spoke 205, among others.

Figure 8:
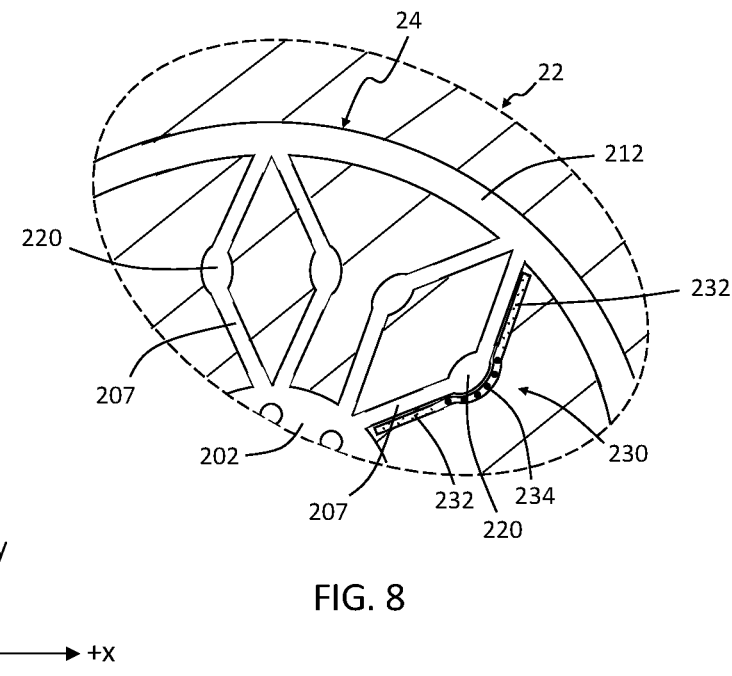
FIG. 8 is an enlarged view of the circled region 6 in FIG. 5 according to another form of the present disclosure.

Referring now to FIG. 8, in some variations of the present disclosure the molding tool 22 comprises thick section cavities 220 positioned along spoke cavities 207 such that regions of the spokes 205 subjected to flexing during use of the non-pneumatic tire 20 have additional thickness (x and y directions) and/or width (z direction) and thereby provide additional support and improved durability of the spokes 205. That is, spokes 205 formed within the spoke cavities 207 shown in FIG. 8 have a thick section at the elbow sections 205a such that the spokes 205 have additional support and improve durability at the elbow sections 205a. It should be understood that the thick section cavities 220, and other thick section cavities disclosed herein, are part of the spoke cavities 207 and are discussed as separate cavities or components (than the spoke cavities 207) for clarity of the description and/or function of the thick section cavities 220.

In some variations of the present disclosure the molding tool 22 includes one or more thermal control channels 230 configured to thermally control cooling of material injected into the molding tool 22 and forming the non-pneumatic tire 20. In some variations of the present disclosure, the thermal control channel 230 includes a heating channel 232. In other variations of the present disclosure, the thermal control channel 230 includes a cooling channel 234. In still other variations of the present disclosure, the thermal control channel 230 includes a heating channel 232 and a cooling channel 234. For example, and as shown in FIG. 8, the thermal control channel 230 includes a pair of heating channels 232 extending proximate and conformal to a pair of spoke cavities 207 and a cooling channel 234 extending proximate and conformal to the thick section cavity 220.

The pair of heating channels 232 and the cooling channel 234 are configured to provide controlled cooling of material molded within the spoke cavities 207 and the thick section cavity 220. In some variations of the present disclosure the pair of heating channels 232 and the cooling channel 234 provide uniform cooling of material molded within the spoke cavities 207 and the thick section cavity 220. That is, the pair of heating channels 232 and the cooling channel 234 ensure a generally uniform cooling rate for material molded within the spoke cavities 207 and the thick section cavity 220. In other variations, the pair of heating channels 232 and the cooling channel 234 provide non-uniform cooling of material injected in the spoke cavities 207 and the thick section cavity 220. That is, the pair of heating channels 232 and the cooling channel 234 ensure material molded within the spoke cavities 207 cools at a different cooling rate than material molded within the thick section cavity 220.

In some variations of the present disclosure, thermal control of selected portions of the non-pneumatic tire 20 during forming thereof results in spokes 205 having enhanced properties compared to spokes 205 formed without thermal control. And it should be understood that while FIG. 8 schematically depicts the thermal control channel 230 extending proximate and conformal to the spoke cavities 207, thermal control channels extending proximate and conformal to other cavities (e.g., the wheel portion cavity 202 and/or the tread ring portion cavity 212) are included within the scope of the present disclosure.

Figure 9:
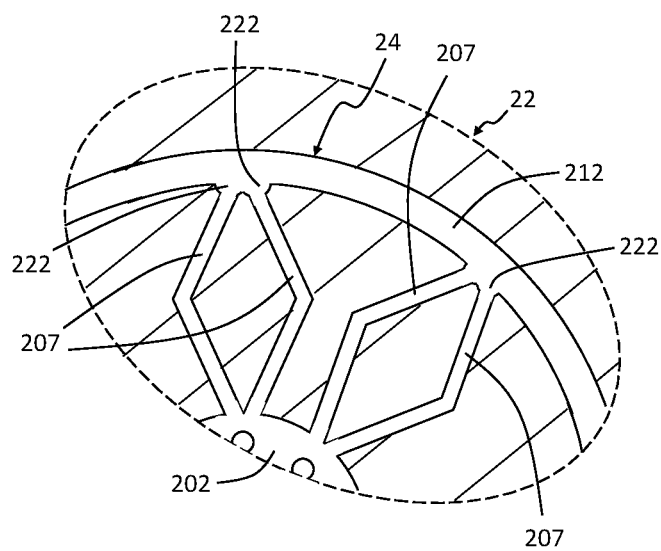
FIG. 9 is an enlarged view of the circled region 6 in FIG. 5 according to still another form of the present disclosure.

Referring now to FIG. 9, in some variations of the present disclosure the molding tool 22 comprises thick section cavities 222 positioned between spoke cavities 207 and the tread ring portion cavity 212. In such variations, regions of the spokes 205 proximate to the tread ring portion 210 have additional thickness (x and y directions). That is, regions of the spokes 205 adjacent and attached to the tread ring portion 212 have additional support during flexing.

Figure 10:
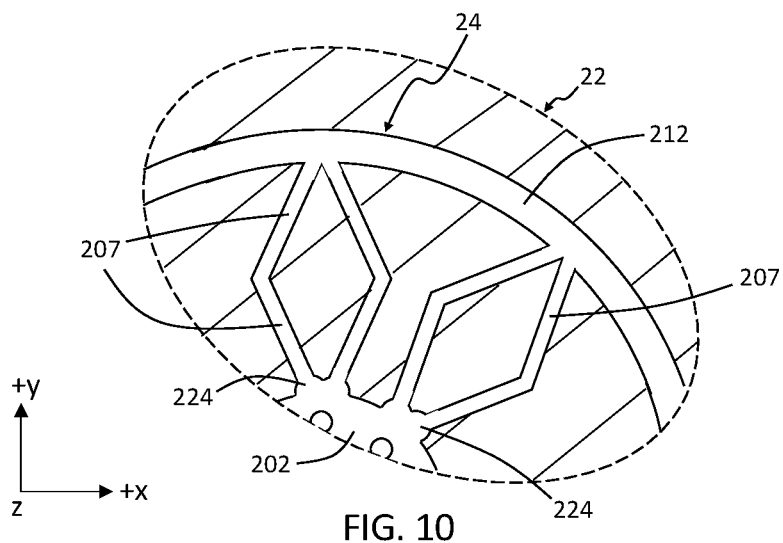
FIG. 10 is an enlarged view of the circled region 6 in FIG. 5 according to yet another form of the present disclosure.

Referring now to FIG. 10, in some variations of the present disclosure the molding tool 22 comprises thick section cavities 224 positioned between spoke cavities 207 and the wheel portion cavity 202. In such variations, regions of the spokes 205 proximate to the wheel portion 200 have additional thickness (x and y directions) and thereby have additional support during flexing.

Figure 11:
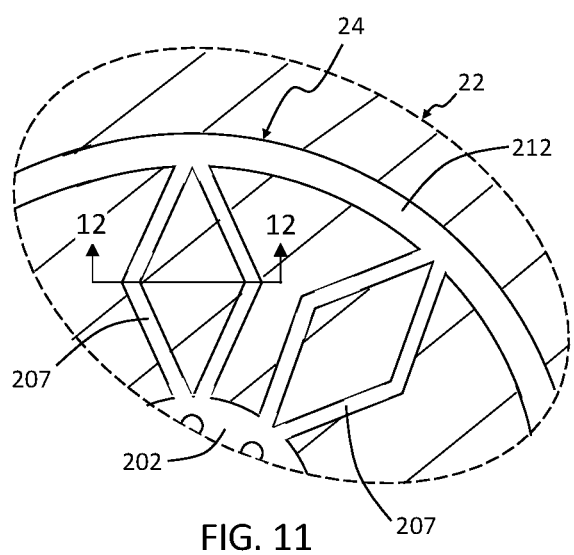
FIG. 11 is an enlarged view of the circled region 6 in FIG. 5 according to still yet another form the present disclosure.
Figure 12A:
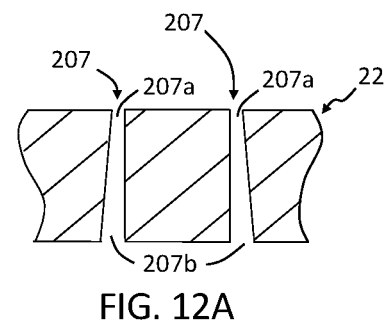
FIG. 12A is a cross sectional view of section 12-12 in FIG. 11 according to one variation of the present disclosure.
Figure 12B:
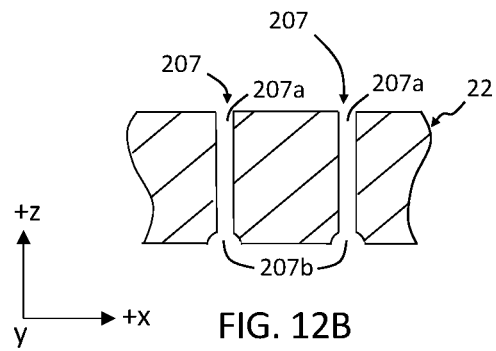
FIG. 12B is a cross sectional view of section 12-12 in FIG. 11 according to another variation of the present disclosure.

In some variations of the present disclosure, the mold cavities extend uniformly along a width (z direction) of the spoke cavities 207. That is, the spoke cavities 207 and the thick section cavities 220, 222, 224 extending in the z-direction depicted in the figures do not vary in dimension along the x- and y-directions. In other variations of the present disclosure, the mold cavities do vary in dimension along the z-direction depicted in the figures. Two non-limiting examples of such z-direction variation are shown in FIGS. 11, 12A and 12B. Particularly, FIG. 12A is a cross-section view of section 12-12 in FIG. 11 with the spoke cavities 207 comprising a first portion 207a (e.g., a narrow portion) and second portion 207b (e.g., a thick section) that is thicker in the (x direction) than the first portion 207a. Accordingly, the spoke cavity 207 has a width gradient (i.e., a dimensional gradient along the z direction). Similarly, FIG. 12B is a cross-section view of section 12-12 in FIG. 11 according to another variation on the present disclosure in which the second end 207b is thicker (x direction) than the first end 207a.

While the pattern 209 and the thick section cavities 220, 222, 224 are schematically depicted as part of the molding tool 22, it should be understood that the non-pneumatic tire 20 includes such features. That is, the non-pneumatic tire 20 formed with the molding tool 22 schematically depicted in FIGS. 6 and 7 includes the pattern 209 on the spokes 207 and the non-pneumatic tire 20 formed with the molding tool 22 schematically depicted in FIG. 8 includes thick spoke sections corresponding to thick section cavities 220. Also, the non-pneumatic tire 20 formed with the molding tool 22 schematically depicted in FIG. 9 includes thick spoke sections corresponding to the thick section cavities 222, and the non-pneumatic tire 20 formed with the molding tool 22 schematically depicted in FIG. 10 includes thick spoke sections corresponding to the thick section cavities 224. It should also be understood that the molding tool 22 can include any combination of the pattern 209, thick section cavity 220, thick section cavity 222, thick section cavity 224, and thermal control channel 230. In addition, it should be understood the molding tool 22 can form patterns of spokes 205 like a bellows configuration to pump or force air from one side of the wheel portion 200 to another side of the wheel portion 200 as the spokes 205 undergo cyclic loading/unloading during use of the non-pneumatic tire 20.

Figure 13:
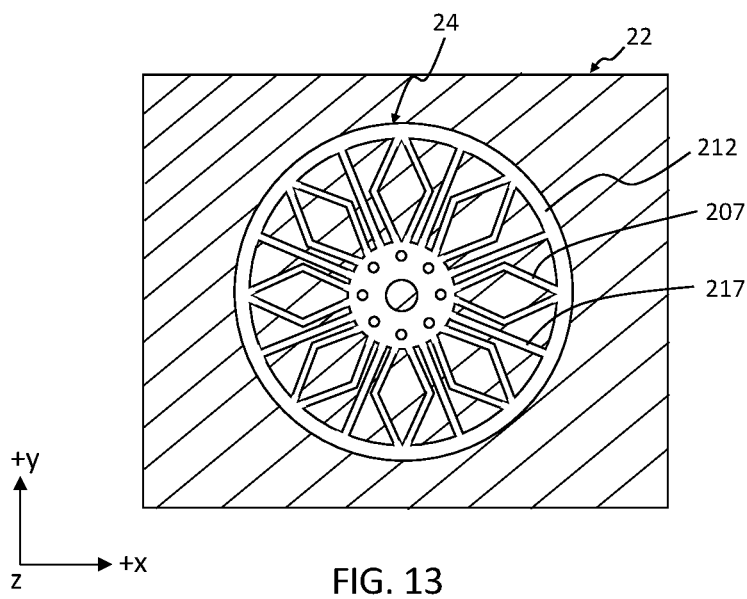
FIG. 13 is a side view of a molding tool according to the teachings of the present disclosure.

Referring now to FIG. 13, in another variation of the present disclosure the molding tool 22 comprises molding cavities that form a least two different types of spokes. One non-limiting example includes the spoke cavities 207 that form a diamond shape (FIG. 4) and spoke cavities 217 that form straight or linear spokes (not shown) extending between the wheel portion 200 and the tread ring portion 210. It should be understood that the spoke cavities 217 can include a variety of thick section cavities, patterns, and the like as discussed above. It should also be understood that other types of spoke designs can be included and that more than two spoke designs can be included in the molding tool 22.

While the figures depict molds for forming spokes with at least one of a non-uniform thickness, a non-uniform height, a non-uniform width and a non-uniform surface, it should be understood that the molds according to the teachings of the present disclosure can form treads with reinforcing geometries, i.e., treads with features comprising at least one of a non-uniform thickness, a non-uniform width and a non-uniform surface. That is, the figures in present disclosure should be interpreted to depict molds for forming treads with similar features as the spokes discussed above. Similarly, the molds according to the teachings of the present disclosure can include conformal heating and cooling channels for the tread and tread features of non-pneumatic tires.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A mold for forming a non-pneumatic tire, the mold comprising:
   a wheel portion cavity and a tread ring portion cavity; and
   a plurality of spoke cavities extending between the wheel portion cavity and the tread ring portion cavity in an XY plane, wherein at least a subset of the plurality of spoke cavities have thick section cavities configured to form spokes with at least one of a non-uniform thickness and a non-uniform width, the thick section cavities extend uniformly in a Z-direction that is perpendicular to the XY plane,
   wherein a thermal control channel conforms to and extends adjacent a respective thick section cavity of the subset of spoke cavities.

2. The mold according to claim 1, wherein each of the spoke cavities of the subset of spoke cavities comprise a non-uniform thickness between the wheel portion cavity and the tread ring portion cavity.

3. The mold according to claim 1, wherein the subset of spoke cavities each comprise a non-uniform a width.

4. The mold according to claim 1, wherein the subset of spoke cavities each comprise a thick section cavity proximate the wheel portion cavity.

5. The mold according to claim 1, wherein the subset of spoke cavities each comprise a thick section cavity proximate the tread ring portion cavity.

6. The mold according to claim 1, wherein the subset of spoke cavities each comprise an elbow between the wheel portion cavity and the tread ring cavity, and a thick section cavity positioned at the elbow.

7. The mold according to claim 1 wherein the thermal control channel extends adjacent at least one mold cavity.

8. The mold according to claim 7, wherein the thermal control channel is a conformal cooling channel.

9. The mold according to claim 7, wherein the thermal control channel is a conformal heating channel.

10. The mold according to claim 7, wherein the thermal control channel comprises a conformal cooling channel and a conformal heating channel.

11. The mold according to claim 1, wherein the plurality of spoke cavities are bounded by spoke cavity walls and at least one of the spoke cavity walls has a surface configured to form a pattern on a spoke surface formed against the at least one of the spoke cavity wall.

12. The mold according to claim 11, wherein the surface of the at least one cavity wall is configured to increase a surface roughness on a spoke surface formed against the at least one of the spoke cavity wall.

13. The mold according to claim 11, wherein the surface of the at least one cavity wall is configured to provide a texture on a spoke surface formed against the at least one of the spoke cavity wall.

14. An additive manufactured mold for forming a non-pneumatic tire, the mold comprising:
   a wheel portion cavity and a tread ring portion cavity; and
   a plurality of spoke cavities extending between the wheel portion cavity and the tread ring portion cavity in an XY plane, wherein at least a subset of spoke cavities within the plurality of spoke cavities comprise at least one of a non-uniform thickness, a non-uniform width, and a non-uniform surface,
   wherein the subset of spoke cavities each comprise at least one thick section cavity and a thermal control channel conforms to and extends adjacent a respective thick section cavity of the subset of spoke cavities, the at least one thick section cavity extends uniformly in a Z-direction that is perpendicular to the XY plane.

15. The additive manufactured mold according to claim 14, wherein the at least one thick section cavity is positioned proximate a least one of the wheel portion cavity, the tread ring portion cavity, and an elbow of each of the subset of spoke cavities.

16. The additive manufactured mold according to claim 14 wherein the thermal control channel extends adjacent at least one of the wheel portion cavity, the tread ring portion cavity, and the subset of spoke cavities.

17. An additive manufactured mold for forming a non-pneumatic tire, the additive manufactured mold comprising:
   a wheel portion cavity and a tread ring portion cavity;
   a plurality of spoke cavities extending between the wheel portion cavity and the tread ring portion cavity in an XY plane, wherein at least a subset of spoke cavities within the plurality of spoke cavities comprise at least one of a non-uniform thickness, a non-uniform width, and a non-uniform surface; and
   a thermal control channel extending adjacent at least one of the wheel portion cavity, the tread ring portion cavity, and the subset of spoke cavities,
   wherein the subset of spoke cavities each comprise at least one thick section cavity and the thermal control channel conforms to and extends adjacent a respective thick section cavity of the subset of spoke cavities, the at least one thick section cavity extends uniformly in a Z-direction that is perpendicular to the XY plane.

* * * * *